United States Patent [19]

Mills

[11] 4,106,034
[45] Aug. 8, 1978

[54] CAMERA HAVING MULTIZONE SHUTTER MECHANISM

[75] Inventor: Loring K. Mills, Hampton, N.H.

[73] Assignee: Polaroid Corporation, Cambridge, Mass.

[21] Appl. No.: 756,431

[22] Filed: Jan. 3, 1977

[51] Int. Cl.² .................... G03B 7/08; G03B 9/46
[52] U.S. Cl. .................................... 354/31; 354/50; 354/236; 354/258
[58] Field of Search .......... 354/31, 122, 125, 234–236, 354/226, 253, 29, 30, 48, 50, 51, 227, 233, 250–255; 355/71; 352/204, 205, 218, 220

[56] References Cited

U.S. PATENT DOCUMENTS

| | | | |
|---|---|---|---|
| 1,416,502 | 5/1922 | Payne | 354/125 |
| 3,116,670 | 1/1964 | Ball | 354/48 |
| 3,122,077 | 2/1964 | Splendore | 354/122 X |
| 3,477,787 | 11/1969 | van Wijngarrt et al. | 355/71 |
| 3,500,729 | 3/1970 | Rentschler | 354/51 |
| 3,555,987 | 1/1971 | Browning | 354/227 |
| 3,712,202 | 1/1973 | Lang | 354/234 |
| 3,971,046 | 7/1976 | Nobusawa | 354/31 |

Primary Examiner—L. T. Hix
Assistant Examiner—William B. Perkey
Attorney, Agent, or Firm—David R. Thornton

[57] ABSTRACT

A shutter mechanism for a camera has a plurality of shutter elements each of which is associated with a predetermined elemental area of a photosensitive film frame located behind the shutter mechanism. Each of the shutter elements is selectively operable independently of the other elements for transmitting light from a scene being photographed to the film area with which the shutter element is associated. Initial acutation of the shutter mechanism causes simultaneous opening of each shutter element for initiating exposure. Then, each shutter element is independently closed in accordance with a predetermined amount of light being incident on the given film area. Thus, the amount of light incident on various elemental areas of the film frame is independently controlled to compress the range of scene brightness to within the linear range of the film.

5 Claims, 7 Drawing Figures

CAMERA HAVING MULTIZONE SHUTTER MECHANISM

BACKGROUND OF THE INVENTION

This invention relates to camera shutter mechanisms, and more particularly, to a shutter mechanism for differentially varying the film exposure over a film frame.

In photographing a scene having large variations in spatial brightness, and particularly where exposure is carried out under the control of a photocell, it is not unusual for details in the brightest regions to be washed out by over-exposure and for details in the darkest region to be concealed by under-exposure of the photosensitive material on the film frame. For a given scene, the extent of the problem depends on the characteristic curve, (i.e., the density-log exposure curve) of the photosensitive material being used. Where the brightness range in the scene being photographed and the photosensitive film material are such that many details are lost by reason of the exposure being determined by the average scene brightness, improved results can be achieved, for some scenes, by controlling exposure in accordance with a spatially weighted average of scene brightness. Thus, it is conventional to weight the photocell viewing angle to reduce the response to light from the upper portion of a scene, which usually will be the sky during daylight, outdoor photography so that the photosensitive element will be more responsive to the central portion of the scene where a person's face, for example, is located in the usual photographic setting. In such case, the central region, where it is desired for the detail to be the most distinct, will dominate the photocell's response and will result in a more pleasing photograph at the expense of some regional over- or under-exposure in peripheral portions of the photograph. The photocell response can be modified by optics associated with the photocell. Alternatively, the response can be electronically modified such as shown in U.S. Pat. No. 3,409,378. Regardless of the technique utilized, however, any improved result will depend on whether the actual scene being photographed corresponds to the design criteria built into the photocell response.

Significant improvement in the photographic image has been achieved by focal plane shutters having a modulated aperture width for differentially exposing individual regions of a film frame in accordance with the brightness of the regions in the scene being photographed. U.S. Pat. No. 3,116,670, which is typical of the above-noted shutter mechanism, discloses a focal plane shutter having means for controlling aperture width to modulate the light reaching the photosensitive material during the transit thereover of the shutter curtain. Such means includes a photocell positioned to receive light passing through the camera lens and reflected from a narrow strip at the leading edge of the curtain slot, and an electromagnet for modulating the width of the slot in accordance with the output of the photocell. Thus, the exposure of elemental strips of the photosensitive material is modulated in accordance with the average brightness of the scene within the strip. Other examples of variable focal plane shutters are described in U.S. Pat. Nos. 3,479,936 and 3,442,198.

While the above noted shutter mechanisms may give improved results in scenes where the brightness gradient runs in the same direction as the direction of movement of the shutter, it cannot provide significant improvement when the brightness gradient in all or a part of the scene is parallel to the slot of the shutter curtain. Furthermore, by reason of the time required for a focal plane shutter to complete its traverse of a film frame, this approach is not suitable for a hand-held camera where maximum exposure time should not exceed about 1/30 of a second to prevent blurring due to reflex movements on the part of the photographer.

It is therefore an object of the present invention to provide a new and improved shutter mechanism of the type described which overcomes or substantially reduces the above-described limitations of conventional shutter mechanisms of the type described.

According to the present invention, there is provided a camera having a segmented shutter mechanism, the latter comprising a plurality of shutter elements, each of which is associated with a predetermined elemental area of the film frame, and each of which is selectively operable independently of the other elements for transmitting light from a given area of the scene being photographed to the elemental area with which the shutter element is associated; and means associated with each shutter element for independently operating the same responsive to the brightness of the different areas of the scene.

The plurality of shutter elements can be arranged in a two-dimensional array with respect to the film frame permitting each elemental area thereof to be exposed in an optimum manner independently of any other area. Thus, a shutter mechanism according to the present invention can enhance the recorded image regardless of the location or direction of brightness gradients in the scene being photographed. More specifically, it advantageously controls the exposure value of each elemental film area of the film by varying the time of exposure for each such area.

In the preferred arrangement, actuation of the shutter mechanism to initiate exposure causes simultaneous unblocking operation of each shutter element for effecting transmission of light from the scene to the film frame. When a total predetermined amount of light is transmitted by each shutter element, the operating means associated with each shutter element terminates operation thereof; interrupting transmission of light and terminating exposure of the elemental area with which the shutter element is associated. Thus, exposure of the elemental areas takes place in parallel; and the maximum time required for the shutter mechanism to effect exposure is no longer than the time required to properly expose the darkest elemental area of the scene being photographed. This can be limited to a maximum time consistent with a hand-held camera.

BRIEF DESCRIPTION OF THE DRAWINGS

An embodiment of the invention as shown in the accompanying drawings wherein.

DESCRIPTION OF THE PREFERRED EMBODIMENT

Figure 1:
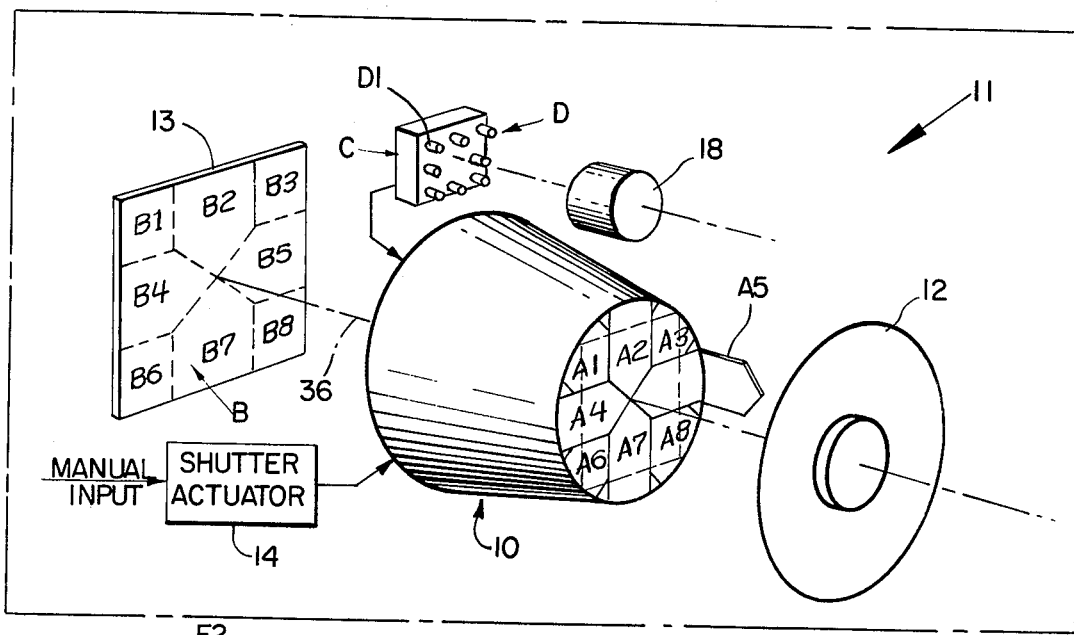
FIG. 1 is a diagrammatic perspective view of the major components of the camera of the present invention, illustrating the multi-segment shutter mechanism thereof and the elemental areas on the film frame with which each shutter segment is associated.

Referring now to FIG. 1, reference numeral 10 designates a shutter mechanism according to the present invention incorporated into camera 11 between objective lens 12 of the camera and photosensitive film frame 13 for photographing a scene on the film frame in response to a manual input applied to shutter actuator 14 (e.g., manual depression of a shutter release button). Mechanism 10 comprises shutter A for effecting exposure of area B on film frame 13 under control of a light evaluating means C which includes photosensitive device or array D located behind lens 18. The field of view of device D is thus made the same as the field of view of film frame 13.

Shutter mechanism A comprises a plurality of shutter elements A1-A8, each of which is spatially arranged to be associated with respective elemental areas B1-B8 of film frame area B, and each of which is selectively operable independently of the other elements for controlling the transmission of light from the scene to only that elemental area which is spacially oriented in a corresponding manner. The light evaluating means C comprises a plurality of operating means C1-C8 (FIG. 2) respectively associated with the shutter elements for independently operating the same under the influence of device D which comprises a plurality of photodetectors D1-D8, each respectively associated with one of the operating means C1-C8. Detectors D1-D8 are spatially arranged in the same pattern as shutter elements A1-A8 so that Detector D1, for example, receives light from the same portion of the scene being photographed as elemental area B1 when shutter element A1 is operated. The resistance of detector D1 is functionally related to the brightness of light incident on area B1 when element A1 is operated.

Mechanism 10 is axially spaced from film frame 13 a distance sufficient to defocus light transmitted by the shutter elements so that the edges of the elemental areas on the film frame actually overlap thus preventing the edges of the shutter elements from producing sharp boundaries on the film frame. To simplify the drawing, however, the elemental areas are shown congruent with the shutter elements with which they are associated.

Effectively, each shutter element (A1-A8) and the operating means associated therewith constitutes a separate shutter for controlling the amount of light incident on the elemental area with which the shutter element is associated. For this reason, only one shutter element and its associated operating means will be described.

Figure 2:
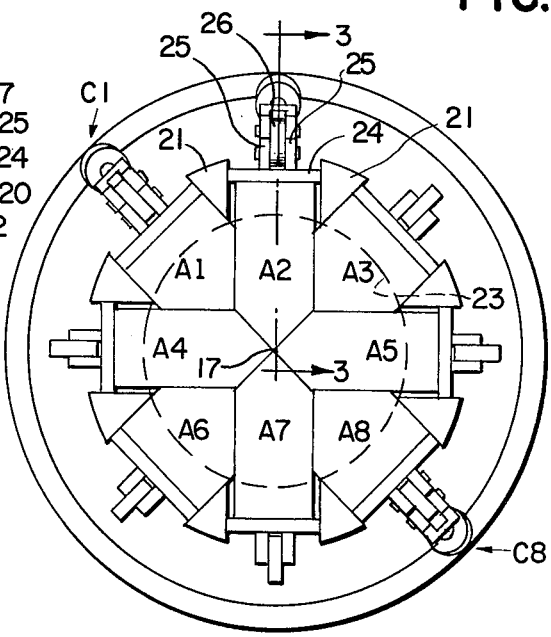
FIG. 2 is a more detailed front view of the preferred embodiment of the shutter mechanism employed in FIG. 1.
Figure 4:
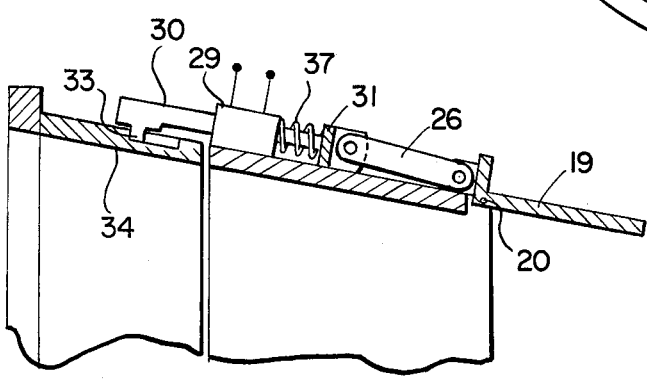
FIG. 4 is a view similar to FIG. 3 but showing the shutter element in its unblocking terminal position.
Figure 5:
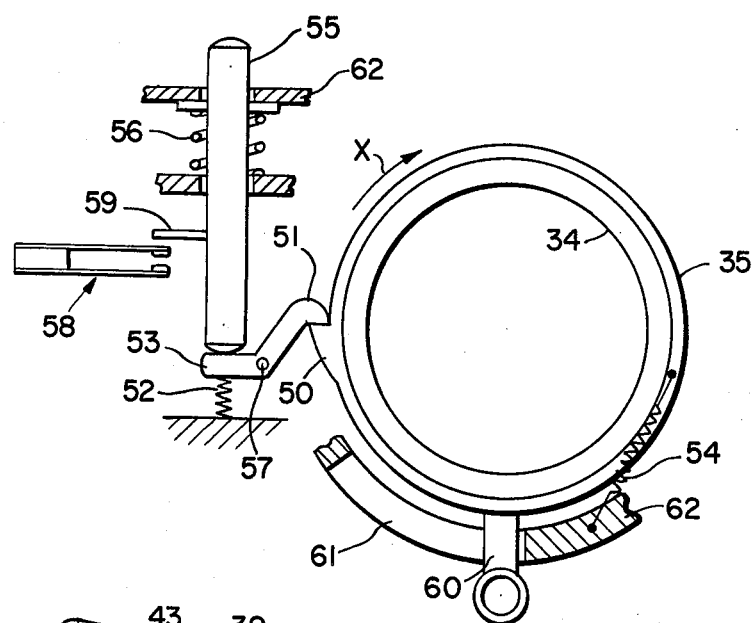
FIG. 5 is a front view of a shutter actuating ring of the shutter mechanism detailed in FIG. 3 and taken along line 5—5 of that figure.

As shown in FIG. 2, each shutter element is in the form of an opaque member which has a first state in which the member is in an unblocking position with respect to the film frame for effecting transmission of light to the elemental area with which the member is associated, and a second state in which the member is in a blocking position for preventing transmission of light to such elemental area. Specifically, each member comprises a flap 19 (FIG. 3) pivotally connected at 20 between a pair of bosses 21 located on the forward axial face of sleeve 22 having an aperture 23 of a size compatible with lens 12 for transmitting light from the scene being photographed to film frame 13. Sleeve 22 is rigidly attached by means (not shown) to the camera housing 62 (FIG. 5). The sleeve 22 is arranged with its longitudinal axis 17 (FIG. 2) coincident with the optical axis 36 of the camera 11. The aperture 23 is located in an imaginary plane passing across one end of the sleeve and centered on the longitudinal axis 17 so as to provide the exposure aperture of the camera, and the pivotal axes 20 of the flaps 19 lie in a plane close to and generally parallel to the plane of the aperture so as to permit pivoting of the flaps from a closed position overlying the exposure aperture as shown in FIG. 3 to an open position as shown in FIG. 4.

Figure 3:
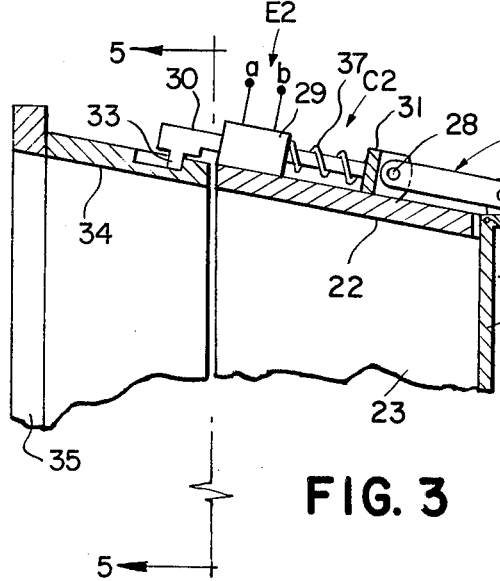
FIG. 3 is a cross-sectional view taken along the line 3—3 of FIG. 2 showing a shutter element in its blocking terminal position.

As shown in FIGS. 2 and 3, a flange 24 extends perpendicularly from flap 19 adjacent pivot 20 and is provided with a pair of spaced ears 25 between which one end of link 26 is received to define a pivotal connection 27. The other end of link 26 is connected by pivot pin 28 to the armature of an electromagnet of the operating means associated with the member to which the link is connected.

FIG. 3 shows electromagnet E2, which is associated with shutter element A2. Each electromagnet comprises a coil 29 with which armature 30 is operatively associated. One end of armature 30 carries yoke 31 to which pin 28 is attached, and the other end of the armature carries a cam follower 33 operatively engaged with cam means 34, such as a sleeve-like member, carried by ring 35 pivotally mounted on the housing of the camera for rotation, with respect to sleeve 22, about the optical axis 36 (FIG. 1). Spring 37 is interposed between coil 29 and yoke 31 such that the spring, through link 26, biases the flap 19 to its blocking position as shown in FIG. 3.

Figure 6:
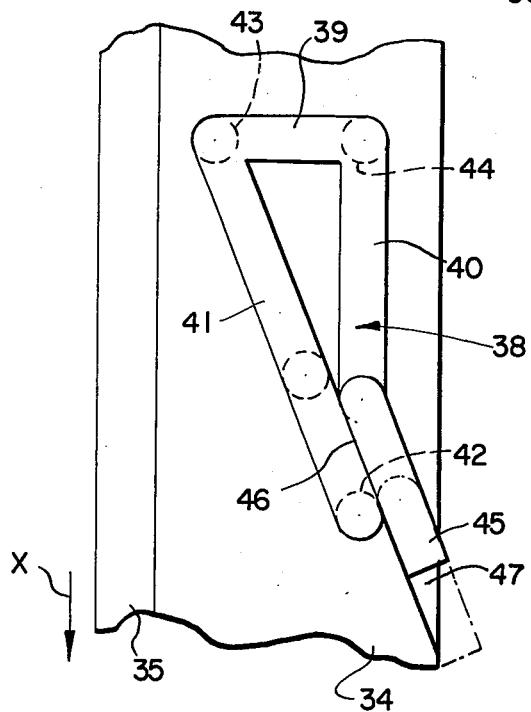
FIG. 6 is a side view of a portion of a cam disc associated with the actuating ring.

The cam means 34 is provided with a plurality of triangular sets of cam grooves 38, each set being associated with one of the electromagnets of the operating means. Each set of grooves, one set of which is shown in FIG. 6, includes an axially directed portion 39 connected to a transverse portion 40 which is also connected by an inclined portion 41 to portion 39. Cam follower 33 is operatively held in engagement with the groove 38 by virtue of the extension of the armature 30 through the coil 29 (see FIG. 3). When the follower is located at position 42, the armature occupies the position shown in FIG. 3 where flap 19 is in its blocking position. A plurality of slide members 45, shown in FIG. 6, are operatively coupled to each set of grooves to insure initial travel of the follower 33 in the inclined groove portion 41. The slide member 45 is mounted in a track 47 which intersects the groove portion 40 in parallel, adjacent relation to the inclined groove portion 41, and is biased by a spring (not shown) toward the groove portion 40 so as to initially close off that portion from the follower 33 and thereby facilitate initial movement of the latter along the inclined portion 41 as subsequently explained. By rotating ring 35 in the direction of arrow X relative to sleeve 22 through a predetermined angle, follower 33 engages the edge 46 of the slide member 45 and is forced into and along the groove portion 41 to position 43 thereby axially displacing the armature 30 from its extended position shown in FIG. 3 to its retracted position shown in FIG. 4. This axial displacement moves flap 19 from its blocking to its unblocking position against the bias of spring 37. If coil 29 of the electromagnet is energized just prior to the time that the follower arrives at position 43 in the groove, armature 30 will remain in the position shown in FIG. 4 against the bias of spring 37 thus holding the flap in its unblocking position until coil 29 is de-energized.

When coil 29 is de-energized, spring 37 moves armature 30 from its position shown in FIG. 4 back to the position shown in FIG. 3 as follower 33 moves in portion 39 of groove 38 in the cam means 34 to position 44. Flap 19 is thus returned to its blocking position. By rotating ring 35 in a direction opposite to arrow X, follower 33 will move along portion 40 of groove 38 causing slide 45 to be retracted against its spring bias (not shown) in the process until follower 33 reoccupies position 42. When this occurs, slide 45 snaps back to the position shown in FIG. 6 to provide an edge 46 against which the follower bears when ring 35 is once more moved in the direction of arrow X.

The manner in which ring 35 is moved in the direction of arrow X and in the opposite direction is shown in FIG. 5. As indicated previously, ring 35 is rotatably mounted with respect to camera housing 62, and is provided with a lug 50 projecting therefrom for operative engagement with pawl 51 which is pivotally mounted on the camera housing for engagement with the lug 50 by reason of the action of spring 52 acting on tail 53 of the pawl. Ring 35 is urged in the direction of arrow X by spring 54. When shutter release button 55 is depressed against the action of spring 56, tail 53 of pawl 51 pivots about pin 57 removing the pawl from lug 50 and allowing spring 54 to rotate ring 35 sharply in the direction of arrow X. When this occurs, each of the armatures associated with the coils of electromagnets E1-E8 (FIG. 7) mounted on sleeve 22 is rapidly moved from a retracted position shown in FIG. 3 to an extended position shown in FIG. 4, simultaneously moving each of the flaps from blocking to unblocking position. Simultaneously with the inward movement of shutter release button 55, initiating switch 58 is closed by engagement with the projection 59 on the shutter release button for the purpose of simultaneously energizing the electromagnets E1-E8.

A given electromagnet remains energized until a predetermined amount of light is incident on the elemental area of the film frame associated with the electromagnet. For example, electromagnet E1 remains energized until the amount of light incident on area B1 reaches a predetermined amount as monitored by D1. When this occurs, the electromagnet is de-energized allowing the flap (A1) controlled by the electromagnet to return to its blocking position under the bias exerted by coil spring 37 operating on the armature of the electromagnet. As a consequence, each of the elemental areas in the film frame is exposed in an optimum manner consistent with the amount of light incident on the elemental area.

After each of the flaps 19 is returned to its blocking position, ring 35 can be returned to its initial position in a direction opposite to the direction of arrow X by applying a manual return movement to extension 60 which is rigidly attached to the ring and extends through an opening 61 in the housing 62 of the camera. Manual return movement applied to the ring can occur until pawl 51 snaps behind lug 50 preparing the ring for simultaneously opening the flaps during the next cycle of operation of the shutter mechanism.

Hence, it should be understood that the shutter mechanism 10 comprises a multizone shutter wherein each zone is independently controlled such that a given flap (e.g. A2), its associated drive mechanism E2, and its timing circuitry later explained in detail in FIG. 5, comprises means for controlling the amount of light flux passing from a selected scene area to a pictorially corresponding area of the film. The shutter zones are selected so that the associated film areas (and also the scene areas) are at least contiguous. To accomplish the latter, the shutter mechanism 10 is located sufficiently close to the shutter plane to provide independent area or zone control over the transmitted image carrying rays from each scene area and yet sufficiently spaced from the film plane to provide blurring of the shutter flap edges on the film; the latter preventing sharp lines of demarcation between the different film areas in the exposed film.

Each of the flaps A1-A8 in conjunction with aperture 20 control the light flux passing to a different area of the film so that the exposure value to which each film area is exposed is directly proportional to the time interval that its associated flap is open. The open time of each flap, and hence, the exposure interval of each zone is determinative of the exposure of each film area. Consequently, the exposure density of each film area is not only proportional to the brightness of its associated scene area, but also directly proportional to the open time of its associated shutter segment such that by merely varying the open time of each shutter segment, the exposure density of each film area may be varied or controlled relative to all other film areas.

In the illustrated embodiment, a first set of flaps designated A2, A4, A5 and A7 in FIGS. 1 and 2 are elongated flaps which extend from the perimeter of aperture 23 (the latter defining the outer limits of the cone shaped bundle of rays passing from the lens 12 to the film 13) to the center of this aperture. Each of this first set of flaps are equally spaced around the aperture, are substantially identical in shape and join (when closed) at the center of the aperture along contiguous and preferably slightly overlapping borders. A second set of equally shaped flaps A1, A3, A6 and A8 are also spaced around the perimeter of aperture 23 with each of the second set interposed between adjacent flaps of the first set, the second set of flaps being of relatively short length and extending radially from the periphery of the aperture 23 to the adjacent elongated flaps. In the illustrated embodiment, each set of flaps includes four flaps, however, it should be noted that each set could include any number of equally spaced flaps. Further, more than two sets of flaps could be employed. To avoid jamming of the shutter flaps on each other as they close, the flap hinges may be made loose to permit lateral movement of the flap, or the circuitry may be programmed to prevent precise simultaneous closing of any overlapping members.

Figure 7:
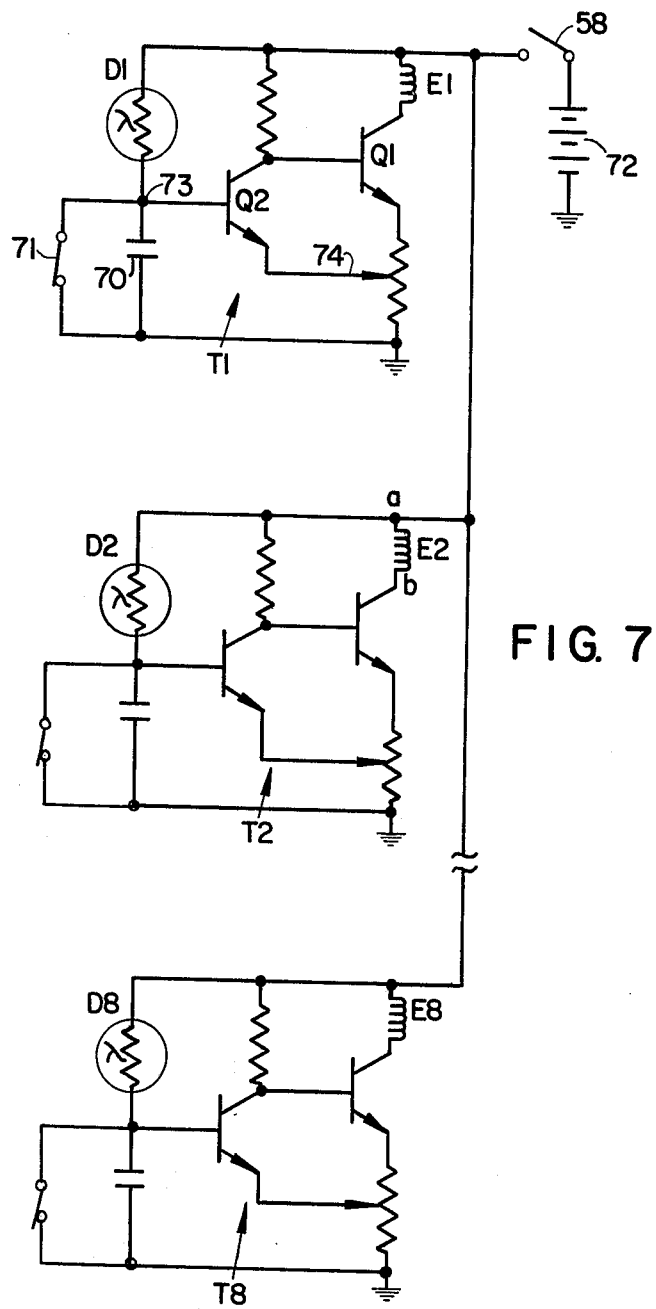
FIG. 7 is a block diagram of the circuitry for controlling the operating means of the shutter mechanism shown in FIGS. 1-4.

Turning now to the timing of the shutter operation, it should be noted that the light evaluating means C1-C8 respectively control the shutter elements A1-A8 and may include a Schmitt trigger circuit similar to that disclosed in U.S. Pat. No. 3,205,803 for maintaining energization of the electromagnet of the drive means E1-E8 until the voltage on an integrator reaches a threshold, the time constant of the integrator being determined by the resistance of the detector of the operating means. A given integrator thus constitutes a photosensitive device for detecting the amount of light incident on an elemental area of the film frame associated with a shutter element operated by the operating means containing the given integrator. This approach is shown in FIG. 7 wherein three of trigger circuits T1-T8 are shown. Since each circuit operates in the same fashion, the operation of only circuit T1 will be described.

Before switch 58 is closed (by manual depression of release button 55), detector D1 will have a resistance functionally related to the brightness of an elemental area of the scene corresponding to elemental area B1. Alternatively, an optical system could be used in which device D1 receives light reflected from area B1. In either event, device D1 and capacitor 70 constitute an integrator having a time constant dependent on the brightness of light incident on area B1 when element A1 is in unblocking position. To effect accurate timing, a normally closed switch 71 shunts capacitor 70, the switch being opened by movement of element A1 to its unblocking position.

When switch 58 is closed, node 73 is essentially at ground preventing transistor Q2 from conducting; and transistor Q1 conducts as current passes through the coil of electromagnet E1. If the magnetomotive force is sufficiently strong, the armature will be retracted. However, it is preferred to mechanically retract the armature using cam means 34 in order to minimize power consumption from battery 72, and to design the electromagnet such that the pulling force is just sufficient to hold the armature retracted against the bias of spring 37. With the opening of switch 71, the voltage at node 73 increases toward the battery voltage as capacitor 70 charges. When the voltage at note 73 reaches a level that forwardly biases the base-emitter junction of transistor Q2 (determined by the setting of potentiometer 74) conduction abruptly and regeneratively switches from transistor Q1 to transistor Q2 de-energizing electromagnet E1 and allowing element A1 to return to blocking position. Thus, the amount of light incident on area B1 is dependent only on the brightness of that portion of the scene pictorally corresponding to area B1.

By reason of the independent operation of each of the trigger circuits, areas B1-B8 of the film frame will be exposed independently in accordance with scene brightness in each of the areas. Precise exposure values are thus achieved over the entire film frame regardless of the location or direction of brightness gradients in the scene being photographed. Furthermore, exposure of each of areas B1-B8 takes place in parallel and the maximum time to complete exposure is the time required to properly expose the darkest elemental area of the scene being photographed.

The above-noted circuit arrangement, in effect, controls the open time of each of the shutter flaps A1-A8 in accordance to the brightness of each corresponding area of the scene to provide for exposure interval (and hence, an exposure value) for each scene area as a function of the brightness of that area. This provides a compression of the range of scene brightness to within the linear range of the film to thereby greatly enhance the details of all areas of the resultant image. However, since relative brightness of different areas of the photograph are also desirable, a selective compression is in some instances more advantageous. As described and claimed in the copending application Ser. No. 756,433 filed on even data herewith in the name of Nathan Gold, a selective compression may also be achieved with the illustrated shutter mechanism by utilizing a first exposure interval, determined by the brightness scene area for the majority of scene areas (to preserve their recorded relative brightness) and a second interval for only the darkest areas to thereby enhance the recorded detail of the latter.

While the shutter elements in the preferred embodiment are disclosed as pivotal flaps, it is possible to utilize sliding flaps instead. Such sliding flaps could move axially parallel to axis 36 of the shutter mechanism which could be provided with guides that would bend the free ends of the flaps toward the axis to a position that blocks light transmission. Alternatively, the shutter elements could be in the form of an electro-optical shutter wherein the transmission is a function of the voltage applied across a pair of transparent plates. In such case, each of the electro-optical shutter would be independently controlled by the output of a photocell. This arrangement has the advantage of not only providing on-off transmission, but can be utilized to provide proportional transmission.

It is believed that the advantages and improved results furnished by the apparatus of the present invention are apparent from the foregoing description of the several embodiments of the invention. Various changes and modifications may be made without departing from the spirit and scope of the invention as sought to be defined in the claims that follow.

What is claimed is:

1. In a camera having a lens for directing and focusing image-carrying rays from photographic scene to film material located at the camera focal plane, a shutter mechanism actuatable for blocking or unblocking the transmission of image-carrying rays to said focal plane, photosensitive means for sensing the brightness of spatially oriented areas of said scene, and selectively operable means for actuating said camera to expose said film material, the improvement wherein said shutter mechanism includes:

a plurality of opaque shutter elements mounted for displacement independently of each other between a closed position wherein each said element is in blocking relation to light from a respective area of said scene and an open position wherein each said element is in unblocking relation to its respective area of said scene to thereby transmit light therefrom to a respective elemental area of said film material;

means for biasing said shutter elements toward their said closed positions;

means responsive to said selectively operable means for substantially simultaneously displacing said shutter elements to their said open positions to initiate an exposure interval, said displacing means including a member mounted around said shutter elements and adapted for circumferential displacement with respect thereto, said member carrying a plurality of cam surfaces, each operatively coupled to a respective one of said shutter elements such that upon displacement of said member each said shutter element is displaced to its said open position; and means responsive to said brightness sensing means for retaining each said shutter element in its said open position and for subsequently releasing each said shutter element for displacement to its said closed position after an interval related to the brightness of its respective scene area to provide an exposure interval for each elemental area in relation to its respective scene area.

2. In a camera having a lens for directing and focusing image-carrying rays from a photographic scene to film material located at the camera focal plane, a shutter mechanism actuatable for blocking and unblocking the transmission of image-carrying rays to said focal plane, photosensitive means for sensing the brightness of spatially oriented areas of said scene, and selectively operable means for actuating said camera to expose said film material, the improvement wherein said shutter mechanism includes:
   a plurality of opaque shutter elements mounted for displacement independently of each other between a closed position wherein each said element is in blocking relation to light from a respective area of said scene and an open position wherein each said element is in unblocking relation to its respective area of said scene to thereby transmit light therefrom to a respective elemental area of said film material;
   said shutter mechanism including a sleeve having a given longitudinal axis and defining an exposure aperture centered on said longitudinal axis and lying in a given plane, said shutter elements being mounted on said sleeve for pivotal displacement around axes lying in a plane at least parallel to said plane of said aperture between their said closed position wherein said shutter elements overlie and block portions of said aperture and said open position wherein said shutter elements are displaced out of the path of said aperture, and said shutter elements comprise a first set of members substantially equally spaced around said aperture and extending inwardly when in their closed position, from the perimeter of said aperture to at least the center thereof, and a second set of members positioned between adjacent members of said first set and extending inwardly when in their closed position, from said perimeter of said aperture to at least one of said first set of members;
   means for biasing said shutter elements toward their said closed positions;
   means responsive to said selectively operable means for substantially simultaneously displacing said shutter elements to their said open positions to initiate an exposure interval; and
   means responsive to said brightness sensing means for retaining each said shutter element in its said open position and for subsequently releasing each said shutter element for displacement to its said closed position after an interval related to the brightness of its respective scene area to provide an exposure interval for each elemental area in relation to its respective scene area.

3. The mechanism of claim 2 where said first set of members are formed as elongated members having substantially parallel longitudinal edges, and said second set of members are formed to at least adjoin the nearest edges of any two adjacent members of the first set when said members are in their closed position.

4. In a camera having a lens for directing and focusing image-carrying rays from a photographic scene to film material located at the camera focal plane, a shutter mechanism actuatable for blocking or unblocking the transmission of image-carrying rays to said focal plane, photosensitive means for sensing the brightness of spatially oriented areas of said scene, and selectively operable means for actuating said camera to expose said film material, the improvement wherein said shutter mechanism includes:
   a plurality of opaque shutter elements mounted for displacement independently of each other between a closed position wherein each said element is in blocking relation to light from a respective area of said scene and an open position wherein each said element is in unblocking relation to its respective area of said scene to thereby transmit light therefrom to a respective elemental area of said film material, said shutter mechanism including a sleeve having a given longitudinal axis and defining an exposure aperture centered on said longitudinal axis and lying in a given plane, said shutter elements being mounted on said sleeve for pivotal displacement around axes lying in a plane at least parallel to said plane of said aperture between said closed position wherein said shutter elements overlie and block portions of said aperture and said open position wherein said shutter elements are displaced out of the path of said aperture, said shutter elements comprising a first set of members substantially equally spaced around said aperture and extending inwardly when in their closed position, from the perimeter of said aperture to at least the center thereof, and a second set of members positioned between adjacent members of said first set and extending inwardly when in their closed position, from said perimeter of said aperture to at least one of said first set of members; and
   means responsive to said selectively operable means and said brightness sensing means for displacing said shutter elements to their said open positions to initiate an exposure interval, and for subsequently displacing each said shutter element back to its closed position.

5. The mechanism of claim 4 wherein said first set of members are formed as elongated members having substantially parallel longitudinal edges, and said second set of members are formed to at least adjoin the nearest edges of any two adjacent members of the first set when said members are in their closed position.

* * * * *